United States Patent
Li et al.

(10) Patent No.: US 9,091,854 B2
(45) Date of Patent: Jul. 28, 2015

(54) MICRO MIRROR STRUCTURE AND PROJECTION APPARATUS

(71) Applicant: Himax Display, Inc., Tainan (TW)

(72) Inventors: Yuet-Wing Li, Tainan (TW); Kuan-Hsu Fan-Chiang, Tainan (TW)

(73) Assignee: Himax Display, Inc., Tainan (TW)

( * ) Notice: Subject to any disclaimer, the term of this patent is extended or adjusted under 35 U.S.C. 154(b) by 94 days.

(21) Appl. No.: 13/925,416

(22) Filed: Jun. 24, 2013

(65) Prior Publication Data

US 2014/0009744 A1 Jan. 9, 2014

Related U.S. Application Data

(60) Provisional application No. 61/668,462, filed on Jul. 6, 2012.

(51) Int. Cl.
*G03B 21/28* (2006.01)
*G02B 26/08* (2006.01)
(Continued)

(52) U.S. Cl.
CPC ............ *G02B 26/0833* (2013.01); *G02B 7/198* (2013.01); *G02B 26/08* (2013.01); *G03B 21/28* (2013.01); *G02B 26/06* (2013.01); *G02B 26/0841* (2013.01)

(58) Field of Classification Search
CPC . G02B 26/06; G02B 26/0833; G02B 26/0841
USPC ........................ 353/30, 34, 37, 49, 78, 98, 99; 348/743–747, 770, 771, 77; 359/237, 359/291, 224, 295, 298
See application file for complete search history.

(56) References Cited

U.S. PATENT DOCUMENTS 5,570,135 A * 10/1996 Gove et al. ..................... 348/581
6,147,790 A * 11/2000 Meier et al. .................... 359/291
6,972,736 B1   12/2005 Wada et al.
(Continued)

FOREIGN PATENT DOCUMENTS

CN      1122550      5/1996
CN    101029966      9/2007
(Continued)

OTHER PUBLICATIONS

"Office Action of Taiwan Counterpart Application", issued on Sep. 4, 2014, p. 1-p. 6.
(Continued)

*Primary Examiner* — Sultan Chowdhury
(74) *Attorney, Agent, or Firm* — J. C. Patents

(57) ABSTRACT

A micro mirror structure and a projection apparatus using the same are provided. The micro mirror structure suitable for being used in a digital micro mirror device of a projection apparatus. The micro mirror structure includes a micro mirror, a pair of main posts and a pair of landing posts. The micro mirror is configured to swing about a swinging hinge, wherein the swinging hinge is extended along a first axis parallel to a first side of the micro mirror and the length of the swinging hinge is greater than the length of the first side of the micro mirror. The main posts are respectively disposed on two opposite ends of the swinging hinge for supporting the swinging hinge and the micro mirror. The pair of landing posts are respectively disposed at two opposing sides of swinging hinge along a second axis perpendicular to the first axis.

11 Claims, 5 Drawing Sheets

(51) Int. Cl.
  *G02B 7/198* (2006.01)
  *G02B 26/06* (2006.01)

(56) References Cited

U.S. PATENT DOCUMENTS

| | | | |
|---|---|---|---|
| 7,436,572 B2 * | 10/2008 | Huibers et al. | 359/291 |
| 7,654,677 B2 * | 2/2010 | DiCarlo et al. | 353/99 |
| 2004/0184132 A1 * | 9/2004 | Novotny et al. | 359/290 |
| 2005/0128564 A1 * | 6/2005 | Pan | 359/291 |
| 2006/0066820 A1 * | 3/2006 | Kimura | 353/99 |
| 2007/0126997 A1 | 6/2007 | Kang | |
| 2008/0074728 A1 * | 3/2008 | Ogikubo et al. | 359/292 |

FOREIGN PATENT DOCUMENTS

| | | |
|---|---|---|
| TW | 266349 | 12/1995 |
| TW | 331638 | 5/1998 |
| TW | 200907543 | 2/2009 |
| TW | 201024203 | 7/2010 |

OTHER PUBLICATIONS

"Office Action of Chinese Counterpart Application", issued on Mar. 30, 2015, p. 1-p. 8.

* cited by examiner

US 9,091,854 B2

MICRO MIRROR STRUCTURE AND PROJECTION APPARATUS

CROSS-REFERENCE TO RELATED APPLICATION

This application claims the priority benefits of U.S. provisional application Ser. No. 61/668,462, filed on Jul. 6, 2012. The entirety of the above-mentioned patent applications is hereby incorporated by reference herein and made a part of this specification.

BACKGROUND OF THE INVENTION

1. Field of the Invention

The present invention generally relates to a mirror structure and a projection apparatus. More particularly, the present invention relates to a mirror structure and a projection apparatus using the same.

2. Description of Related Art

With the development of technology, different kinds of projection apparatuses are widely used in various circumstances. Projection apparatuses are display apparatuses for generating images with large size. The image of the projection apparatus is produced by using a light valve to convert an illumination beam generated by a light source module into an image beam and a lens module to project the image beam onto a screen or a wall. With advancing of the projecting technology and reducing of fabrication cost, the digital light processing projector (DLP projector) is being widely used.

In a conventional digital light processing (DLP) projector, a key component called "digital mirror device" (DMD) is the fundamental semiconductor component. The chip of the digital mirror device is adopted for controlling the digital optical switch by rapidly and precisely reflecting the light source. Unlike the conventional liquid crystal projector that modulates the light by using liquid crystal (LCD) to change the polarization state, DLP projector uses the reflection of micro mirrors to modulate the light. Therefore, the weight of the DLP projector may be reduced to 2.5 kg or less, compared with 8 to 15 kg of a conventional projector. In addition, the volume of the DLP projector can also be minimized. In general, the optical efficiency and contrast of the DLP projector is better than that of the conventional projector, since the digital mirror device uses non-polarized light and switches light by mirrors. Therefore, the DLP projector can be used when high brightness and high resolution is required. In addition, the image reproduced from the DLP projector is a real and stable digital image with correct colors.

However, as the demand of the display quality and the magnifying power of the image increase gradually, the size of the optical engine of the projection apparatus is also increased. For this reason, the size of the projection apparatus is also increased, and this conflicts with the purpose of weight lightening and size minimizing of the DLP projectors. Therefore, to develop a more compact optical engine while maintain the display quality is an important topic in the industry of projection apparatus.

SUMMARY OF THE INVENTION

Accordingly, the present invention is directed to a micro mirror structure which is more compact in size and provides higher resolution to the projection apparatus using the same.

The present invention is directed to a projection apparatus which the micro mirror structures thereof are more compact and the resolution is also improved.

The present invention provides a micro mirror structure suitable for being used in a digital micro mirror device of a projection apparatus. The micro mirror structure includes a micro mirror, a pair of main posts and a pair of landing posts. The micro mirror is configured to swing about a swinging hinge, wherein the swinging hinge is extended along a first axis parallel to a first side of the micro mirror and the length of the swinging hinge is greater than the length of the first side of the micro mirror. The main posts are respectively disposed on two opposite ends of the swinging hinge of the micro mirror for supporting the swinging hinge and the micro mirror. The landing posts are respectively disposed at two opposing sides of swinging hinge along a second axis perpendicular to the first axis.

The present invention provides a projection apparatus. The projection apparatus includes a light source module, a digital micro mirror device and a projection lens. The light source module is configured to provide an illumination beam. The digital micro mirror device is disposed on a transmission path of the illumination beam for reflecting the illumination beam to form an image beam. The digital micro mirror device includes a plurality of micro mirror structures arranged in delta type array, each of the micro mirror structures includes a micro mirror, a pair of main posts and a pair of landing posts. The micro mirror is configured to swing about a swinging hinge. The swinging hinge is extended along a first axis parallel to a first side of the micro mirror and the length of the swinging hinge is greater than the length of the first side of the micro mirror. One end of the swinging hinge of each micro mirrors structure in the $i_{th}$ column of the delta type array is located under the first side of the corresponding micro mirror structure in the $(i+1)_{th}$ column of the delta type array. The main posts are respectively disposed on two opposite ends of the swinging hinge for supporting the swinging hinge and the micro mirror. The landing posts are respectively disposed at two opposing sides of the swinging hinge along a second axis perpendicular to the first axis. The projection lens is disposed on a transmission path of the image beam.

According to an embodiment of the present invention, the micro mirror structure further includes at least one first electrode and at least one second electrode. The first electrode and the second electrode are respectively disposed at two opposing sides of swinging hinge along the second axis.

According to an embodiment of the present invention, the length of each side of the micro mirror is about 6.5 μm.

According to an embodiment of the present invention, the length of each side of the micro mirror is less than 7.5 μm.

According to an embodiment of the present invention, the length of the swinging hinge is about 12.5 μm.

According to an embodiment of the present invention, each of the micro mirror comprises a landing tip located on the bottom surface of the micro mirror, when the micro mirror swings about the swinging hinge and is tilted toward the corresponding landing post, the landing tip contacts the top of the corresponding landing post.

According to an embodiment of the present invention, the material of each landing tip comprises Aluminium or Aluminium Titanium Nitride (AlTiN).

According to an embodiment of the present invention, the $i_{th}$ column and the $(i+1)_{th}$ column of the delta type array are in interlaced arrangement.

Based on the above mention description, the micro mirror structures of the digital micro mirror device in the present invention are arranged in delta type array, and the swinging hinge is extended along an axis parallel to a side of the micro mirror. Also, the length of the swinging hinge is greater than the length of the first side of the micro mirror. In this arrangement, one end of the swinging hinge of each micro mirrors structure in the $i_{th}$ column can be hidden under a top side of the corresponding micro mirror structure in the $(i+1)_{th}$ column, and the size of the micro mirror can be effectively reduced. Therefore, with smaller size of the micro mirror, the resolution of the projection apparatus can be improved and the size of the projection apparatus can be reduced.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
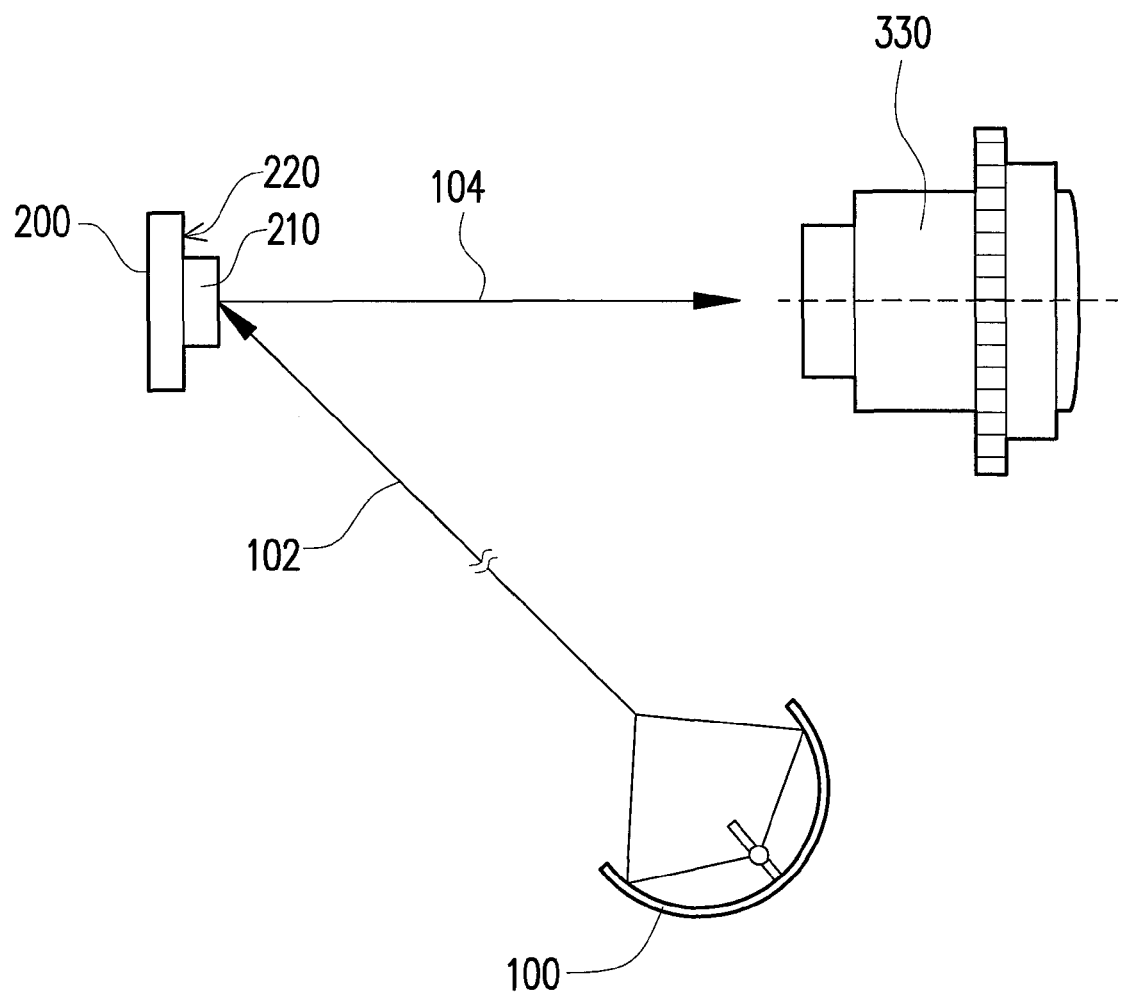
FIG. 1 illustrates a projection apparatus according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 illustrates a projection apparatus according to an embodiment of the invention. Referring to FIG. 1, in the present embodiment, the projection apparatus 10 includes a light source module 100, a digital micro mirror device 200 and a projection lens 300. The light source module 100 is configured to provide an illumination beam 102 (FIG. 1 only shows a chief beam of the illumination beam 102). The digital micro mirror device 200 is disposed on a transmission path of the illumination beam 102 for reflecting the illumination beam 102 to form an image beam 104. The digital micro mirror device 200 includes a plurality of micro mirrors structures 210 and an active surface 220. The micro mirrors structures 210 are respectively disposed on the active surface 220. The projection lens 300 is disposed on a transmission path of the image beam 104 to project the imaging beam 104 onto a screen (not shown), thus forming an image on the screen. In the present embodiment, the projection apparatus 10 is, for example, a digital light processing (DLP) projector which uses the reflection of micro mirror structures 210 to modulate the light.

Figure 2:
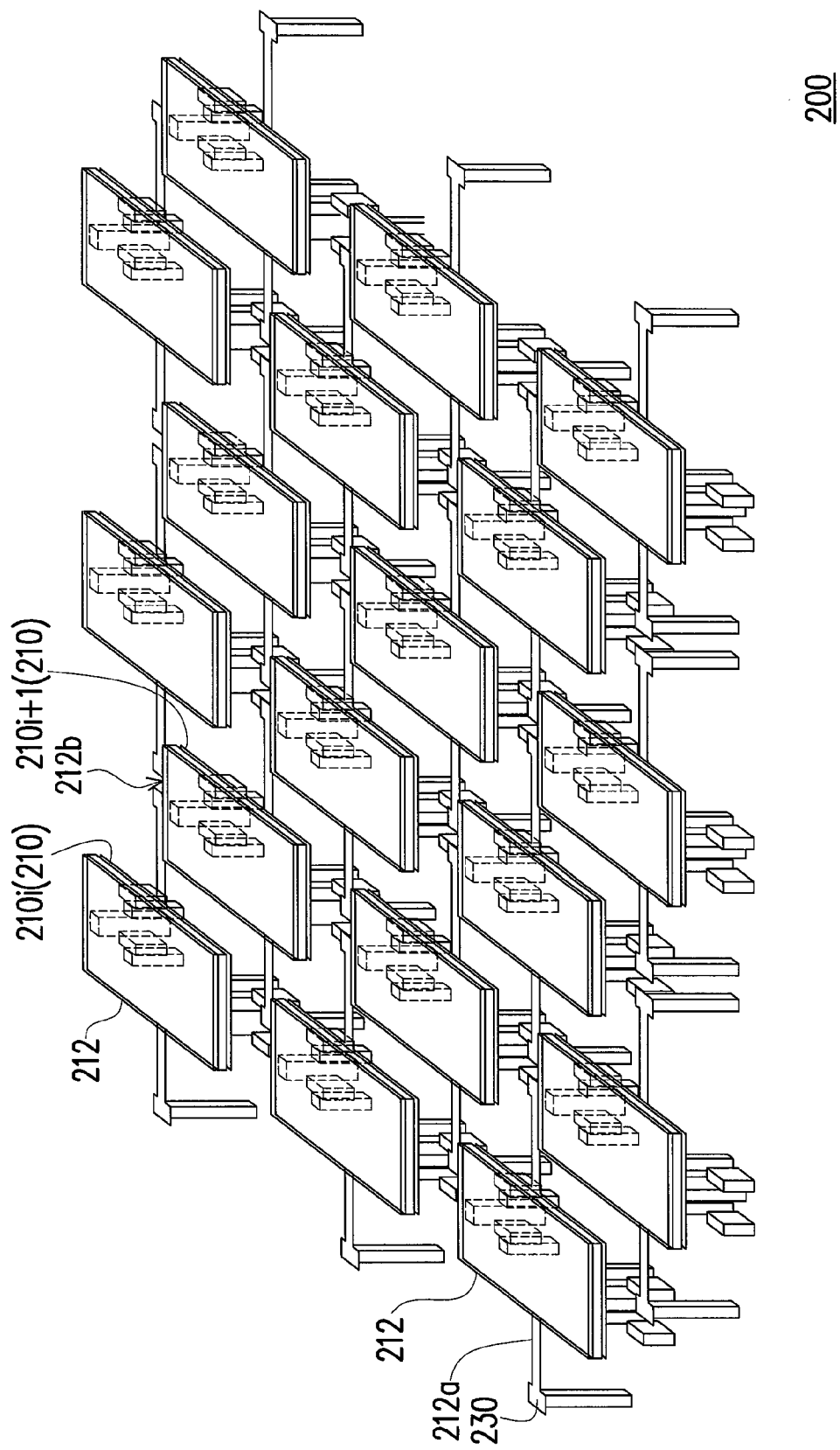
FIG. 2 illustrates a digital micro mirror device of the projection apparatus in FIG. 1.

FIG. 2 illustrates a digital micro mirror device of the projection apparatus of FIG. 1. Referring to FIG. 2, the digital micro mirror device 200 includes a plurality of micro mirror structures 212 arranged in delta type array. In the present embodiment, the delta type array means that the $i_{th}$ column of the micro mirror structures and the $(i+1)_{th}$ column of the micro mirror structures are not in bracketed arrangement, but in interlaced arrangement instead. To be more specific, each micro mirror structure $210_i$ in the $i_{th}$ column are located half of the micro mirror structure 210 higher (or lower) than the corresponding micro mirror structure $210_{i+1}$ in the $(i+1)_{th}$ column, as the micro mirror structures $210_i$ and $210_{i+1}$ shown in FIG. 2. The micro mirror 212 is configured to swing about a swinging hinge 212a having two opposite ends 230, and one of the two opposite ends 230 (the right end is illustrated herein) of the swinging hinge 212a of each micro mirror structure $210_i$ in the $i_{th}$ column is located under the first side 212b of the corresponding micro mirror structure $210_{i+1}$ in the $(i+1)_{th}$ column. Herein, i is a positive integral.

Figure 3:
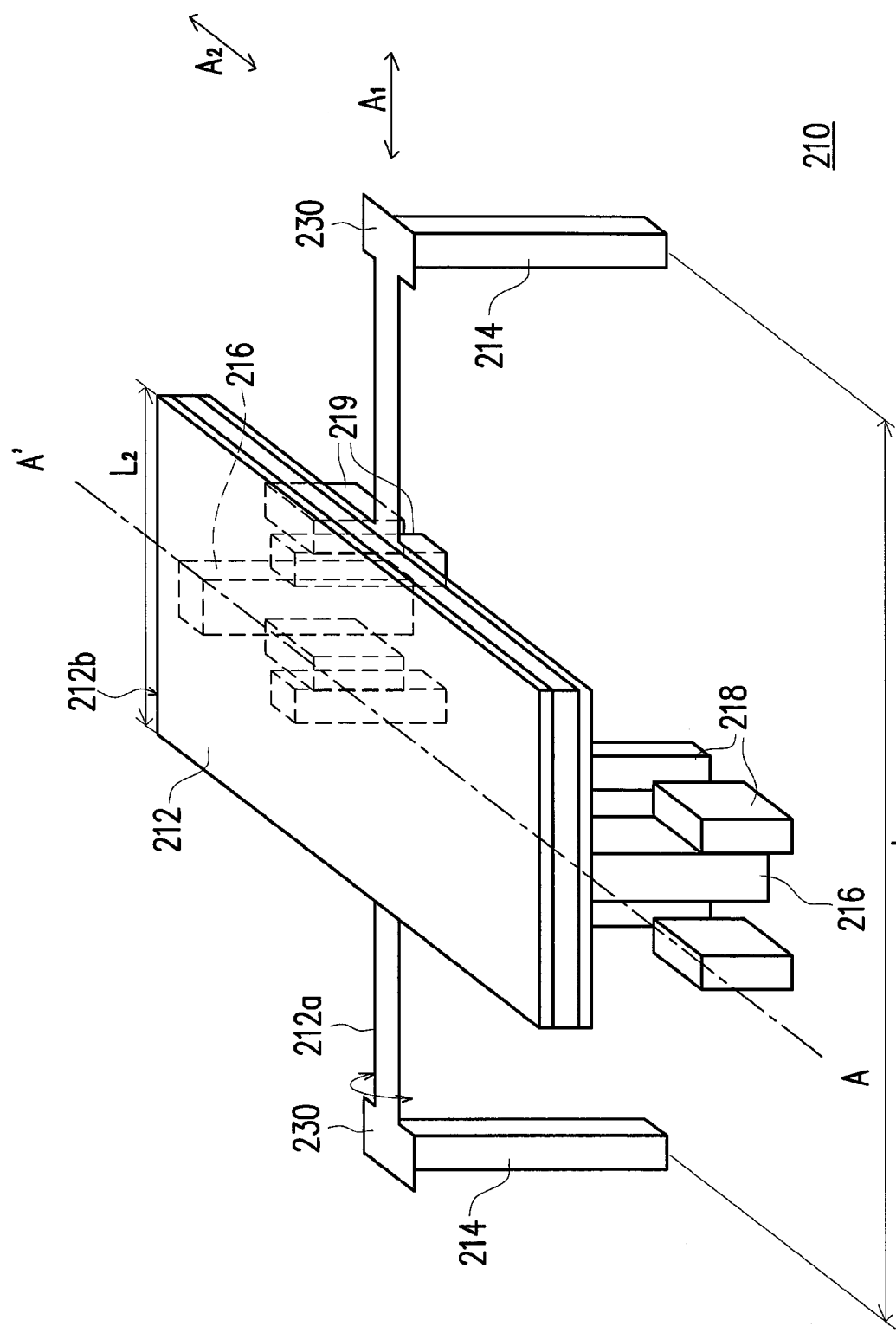
FIG. 3 illustrates a micro mirror structure of digital micro mirror device in FIG. 2.
Figure 4:
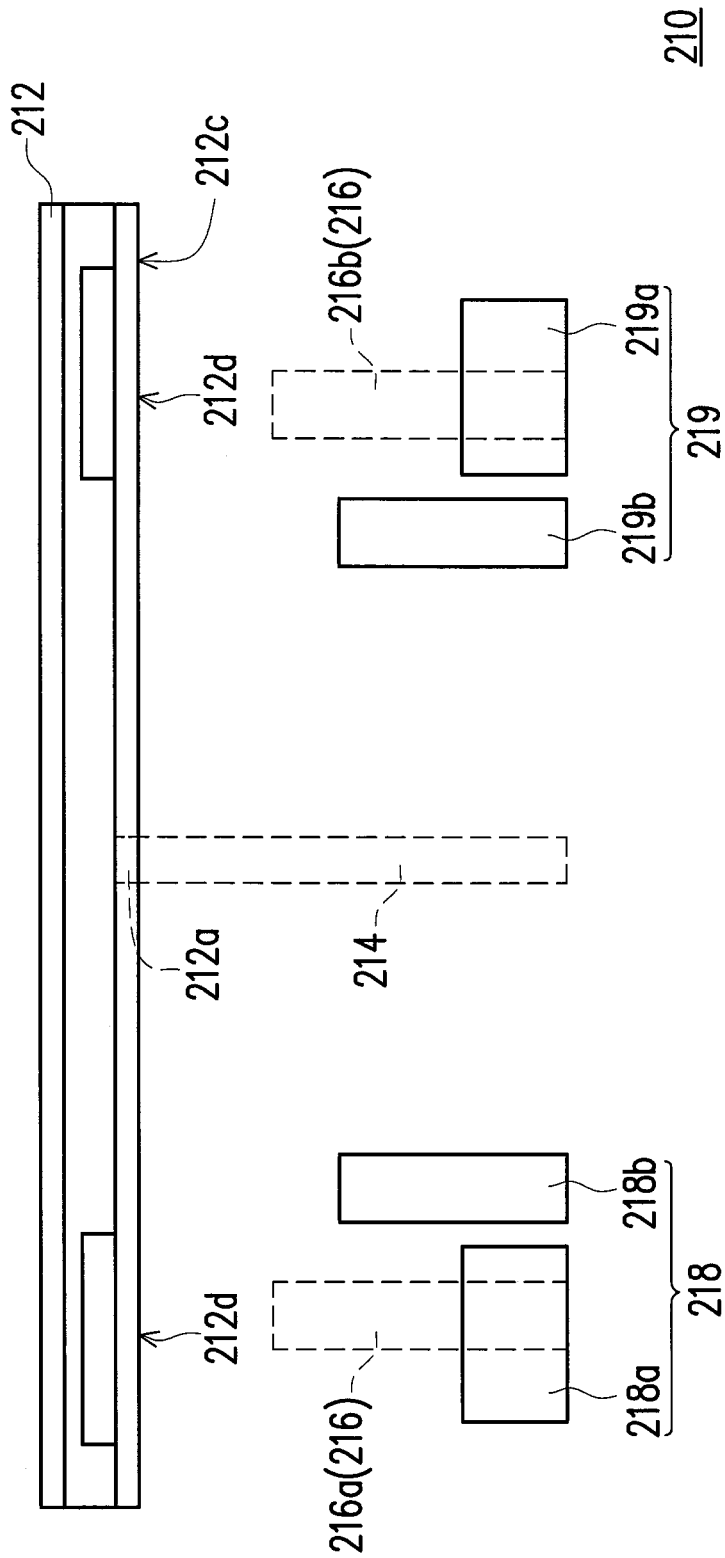
FIG. 4 illustrates a cross-sectional view taken along line A-A of the micro mirror structure in FIG. 3.

FIG. 3 illustrates a micro mirror structure of digital micro mirror device in FIG. 2. FIG. 4 illustrates a cross-sectional view taken along line A-A of the micro mirror structure in FIG. 3. Referring to FIG. 3 and FIG. 4, in the present embodiment, each of the micro mirror structure 210 includes a micro mirror 212, a pair of main posts 214 and a pair of landing posts 216. The micro mirror 212 is configured to swing about a swinging hinge 212a. The swinging hinge 212a is extended along a first axis A1 parallel to a first side 212b of the micro mirror 212. As shown in FIG. 3, the length L1 of the swinging hinge 212a is greater than the length L2 of the first side 212b of the micro mirror 212. In the present embodiment, the length of each side, for example, the length L2 of the first side 212b, of the micro mirror 212 is less than 7.5 µm, to be more specific, the length of each side of the micro mirror 212 is about 6.5 µm, and the length L1 of the swinging hinge 212a is about 12.5 µm. The main posts 214 are respectively disposed on two opposite ends 230 of the swinging hinge 212a for supporting the swinging hinge 212a and the micro mirror 212. The landing posts 216 are respectively disposed at two opposing sides 230 of swinging hinge 212a along a second axis A2 perpendicular to the first axis A1.

In the present embodiment, the micro mirror structure 210 further includes at least one first electrode and at least one second electrode. As shown in FIG. 4, in the present embodiment, the first electrode 218 includes electrodes 218a and 218b. The second electrode 219 includes electrodes 219a and 219b. The micro mirror 212 is biased with a particular voltage as well. If the voltage difference between the micro mirror 212 and the first electrode 218 is larger than the voltage difference between micro mirror 212 and the second electrode 219, the micro mirror 212 rotates about axis A1 and lands on the landing post 216a, which is the landing post at the side where the first electrode 218 is located. Of course, the micro mirror 212 can also rotate and land on the landing post 216b, which is the landing post at the side where the second electrode 219 is located, if the voltage difference between the micro mirror 212 and the second electrode 219 is larger than the voltage difference between micro mirror 212 and the first electrode 218.

Figure 5:
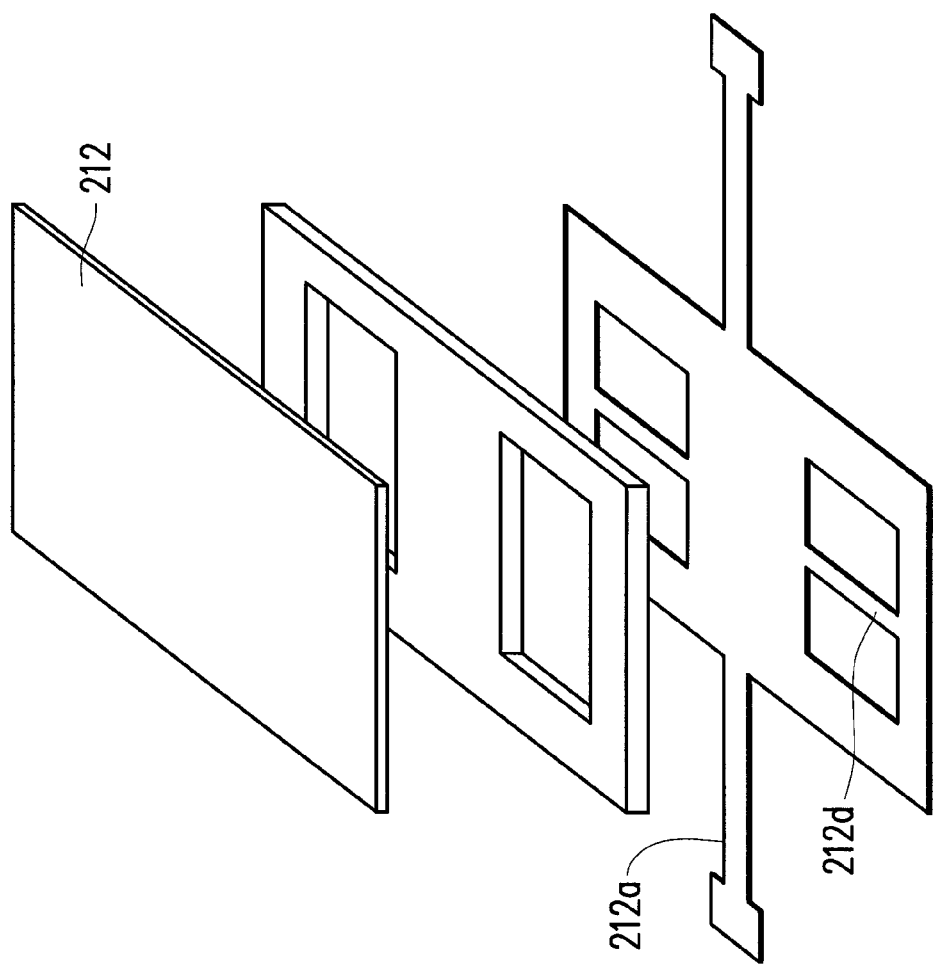
FIG. 5 illustrates an exploded view of the micro mirror in FIG. 4.

Referring to FIG. 4 and FIG. 5, in the present embodiment, each of the micro mirror 212 includes a landing tip 212d located on the bottom surface 212c of the micro mirror 212. When the micro mirror 212 swings about the swinging hinge 212a and is tilted toward the corresponding landing post 216, the landing tip 212d contacts the top of the corresponding landing post 216. In the present embodiment, the material of each landing tip 212d includes Aluminium (Al), Aluminium Titanium Nitride (AlTiN) or any combination thereof. Compared with material of the conventional landing tip which is amorphous silicon (a-Si), the material of the landing tip 212d includes Aluminium (Al) or Aluminium Titanium Nitride (AlTiN) is more stable and less likely to get sticky over time which leads to the landing tip stuck with the landing posts and keep the micro mirror from swinging.

In sum, the micro mirror structures of the digital micro mirror device in the present invention are arranged in delta type array, and the swinging hinge is extended along an axis parallel to a side of the micro mirror. Also, the length of the swinging hinge is greater than the length of the first side of the micro mirror. In this arrangement, one end of the swinging hinge of each micro mirrors structure in the $i_{th}$ column can be hidden under a top side of the corresponding micro mirror structure in the $(i+1)_{th}$ column, and the size of the micro mirror can be effectively reduced. Therefore, with smaller size of the micro mirror, the resolution of the projection apparatus can be improved and the size of the projection apparatus can be reduced.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A micro mirror structure, suitable for being used in a digital micro mirror device, comprising:
   a micro mirror, configured to swing about a swinging hinge, wherein the swinging hinge is extended along a first axis parallel to a first side of the micro mirror and the length of the swinging hinge is greater than the length of the first side of the micro mirror;
   a pair of main posts, respectively disposed on two opposite ends of the swinging hinge for supporting the swinging hinge and the micro mirror; and
   a pair of landing posts, respectively disposed at two opposing sides of swinging hinge along a second axis perpendicular to the first axis, wherein the micro mirror comprises a landing tip located on the bottom surface of the micro mirror, when the micro mirror swings about the swinging hinge and is tilted toward the corresponding landing post, the landing tip contacts the top of the corresponding landing post, and the material of each landing tip comprises Aluminium (Al) or Aluminium Titanium Nitride (AlTiN).

2. The micro mirror structure as claimed in claim 1, further comprises at least one first electrode and at least one second electrode, wherein the first electrode and the second electrode are respectively disposed at two opposing sides of swinging hinge along the second axis.

3. The micro mirror structure as claimed in claim 1, wherein the length of each side of the micro mirror is about 6.5 µm.

4. The micro mirror structure as claimed in claim 1, wherein the length of each side of the micro mirror is less than 7.5 µm.

5. The micro mirror structure as claimed in claim 1, wherein the length of the swinging hinge is about 12.5 µm.

6. A projection apparatus, comprising:
   a light source module, configured to provide an illumination beam; and
   a digital micro mirror device, disposed on a transmission path of the illumination beam for reflecting the illumination beam to form an image beam, the digital micro mirror device comprises a plurality of micro mirror structures arranged in delta type array, each of the micro mirror structures comprising:
   a micro mirror, configured to swing about a swinging hinge, wherein the swinging hinge is extended along a first axis parallel to a first side of the micro mirror and the length of the swinging hinge is greater than the length of the first side of the micro mirror, wherein one end of the swinging hinge of each micro mirror structure in an $i_{th}$ column of the delta type array is located under the first side of the corresponding micro mirror structure in an $(i+1)_{th}$ column of the delta type array;
   a pair of main posts, respectively disposed on two opposite ends of the swinging hinge for supporting the swinging hinge and the micro mirror; and
   a pair of landing posts, respectively disposed at two opposing sides of swinging hinge along a second axis perpendicular to the first axis; and
   projection lens, disposed on a transmission path of the image beam, wherein each of the micro mirror comprises a landing tip located on the bottom surface of the micro mirror, when the micro mirror swings about the swinging hinge and is tilted toward the corresponding landing post, the landing tip contacts the top of the corresponding landing post, and the material of each landing tip comprises Aluminium (Al) or Aluminium Titanium Nitride (AlTiN).

7. The projection apparatus as claimed in claim 6, wherein the $i_{th}$ column and the $(i+1)_{th}$ column of the delta type array are in interlaced arrangement.

8. The projection apparatus as claimed in claim 6, wherein each of the micro mirror structures further comprises at least one first electrode and at least one second electrode, wherein the first electrode and the second electrode are respectively disposed at two opposing sides of swinging hinge along the second axis.

9. The projection apparatus as claimed in claim 6, wherein the length of each side of the micro mirror is about 6.5 µm.

10. The projection apparatus as claimed in claim 6, wherein the length of each side of the micro mirror is less than 7.5 µm.

11. The projection apparatus as claimed in claim 6, wherein the length of the swinging hinge is about 12.5 µm.

* * * * *